(12) United States Patent
Tran et al.

(10) Patent No.: US 10,913,902 B2
(45) Date of Patent: Feb. 9, 2021

(54) PRODUCTION OF HIGH ENERGY-DENSE LIQUID HYDROCARBON FROM LOW ENERGY-DENSE AQUEOUS SOLUTIONS OF OXYGEN CONTAINING ORGANIC COMPOUND(S)

(71) Applicant: Army Research Laboratory, Adelphi, MD (US)

(72) Inventors: Dat T. Tran, Clarksville, MD (US); Ivan C. Lee, Excelsior, MN (US); Luther J. Mahoney, Silver Spring, MD (US); Laleh Emdadi, College Park, MD (US); Chi K. Nguyen, New Windsor, NY (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 16/431,179

(22) Filed: Jun. 4, 2019

(65) Prior Publication Data
US 2020/0056099 A1   Feb. 20, 2020

Related U.S. Application Data

(60) Provisional application No. 62/684,461, filed on Jun. 13, 2018.

(51) Int. Cl.
*C10G 3/00* (2006.01)

(52) U.S. Cl.
CPC ........ *C10G 3/49* (2013.01); *C10G 2300/1011* (2013.01); *C10G 2300/805* (2013.01)

(58) Field of Classification Search
CPC ........... C07C 1/24; C07C 11/04; C07C 11/02; C07C 1/20; C07C 31/08; B01J 2229/26; B01J 2229/42; B01J 2231/60; B01J 29/40; B01J 29/405; B01J 29/48; B01J 31/0227
See application file for complete search history.

(56) References Cited

U.S. PATENT DOCUMENTS

| | | | |
|---|---|---|---|
| 4,698,452 A | 10/1987 | Le Van Mao et al. | |
| 4,847,223 A | 7/1989 | Le Van Mao et al. | |
| 4,873,392 A | 10/1989 | Le Van Mao | |
| 8,193,402 B2 * | 6/2012 | Gruber ..................... | C10L 1/04 585/240 |

OTHER PUBLICATIONS

Roth et al. Catal. Sci. Technol., 2011, 1, 43-53 (Year: 2011).*
(Continued)

*Primary Examiner* — Sharon Pregler
(74) *Attorney, Agent, or Firm* — Eric B. Compton

(57) ABSTRACT

Methods to convert an oxygen containing organic compound(s) to one or more water-free liquid hydrocarbons products. They make use of a catalytic process in a two-stage reactor system having a first reactor and a second reactor in series. Process design is described for effective conversion of aqueous low energy-dense aqueous solutions containing oxygen containing organic compound(s) to liquid hydrocarbons; the process design preferably employs the solid acid catalysts comprised of microporous aluminosilicates denoted as zeolites mixed with silicon carbide binder in series of two reactor system with capability of complete water removal.

22 Claims, 9 Drawing Sheets

(56) References Cited

OTHER PUBLICATIONS

Le Van Mao, R.; Nguyen, T. M.; McLaughlin, G. P., "The bioethanol-to-ethylene (B.E.T.E.) process." Applied Catalysis 1989, 48 (2), 265-277.

Le Van Mao, R..; LÉVesque, P.; Sjiariel, B.; Nguyen, D. T., "Interconversion of light olefins—aromatics over zeolite catalysts." The Canadian Journal of Chemical Engineering 1986, 64 (3), 462-468.

Le Van Mao, R; LÉVesque, P.; Sjiariel, B., "Mn and Zn doped ZSM-5 zeolite catalysts." The Canadian Journal of Chemical Engineering 1986, 64 (3), 514-516.

Le Van Mao, R.; Levesque, P.; McLaughlin, G.; Dao, L. H., "Ethylene from ethanol over zeolite catalysts." Applied Catalysis 1987, 34, 163-179.

Le Van Mao, R.; McLaughlin, G. P., "Conversion of light alcohols to hydrocarbons over ZSM-5 zeolite and asbestos-derived zeolite catalysts." Energy & Fuels 1989, 3 (5), 620-624.

Schulz, J.; Bandermann, F., "Conversion of ethanol over zeolite H-ZSM-5." Chemical Engineering & Technology, 1994, 17 (3), 179-186.

Talukdar, A. K.; Bhattacharyya, K. G.; Sivasanker, S., "HZSM-5 catalysed conversion of aqueous ethanol to hydrocarbons." Applied Catalysis A: General, 1997, 148 (2), 357-371.

Aguayo, A. T.; Gayubo, A. G.; Tarrio, A. M.; Atutxa, A.; Bilbao, J., "Study of operating variables in the transformation of aqueous ethanol into hydrocarbons on an HZSM-5 zeolite." Journal of Chemical Technology & Biotechnology 2002, 77 (2), 211-216.

Barthos, R.; Széchenyi, A.; Solymosi, F., "Decomposition and Aromatization of Ethanol on ZSM-Based Catalysts." The Journal of Physical Chemistry B 2006, 110 (43), 21816-21825.

Gujar, A. C.; Guda, V. K.; Nolan, M.; Yan, Q.; Toghiani, H.; White, M. G., "Reactions of methanol and higher alcohols over H-ZSM-5." Applied Catalysis A: General 2009, 363 (1), 115-121.

Gayubo, A. G.; Alonso, A.; Valle, B.; Aguayo, A. T.; Olazar, M.; Bilbao, J., "Hydrothermal stability of HZSM-5 catalysts modified with Ni for the transformation of bioethanol into hydrocarbons." Fuel 2010, 89 (11), 3365-3372.

Gayubo, A. G.; Alonso, A.; Valle, B.; Aguayo, A. T.; Bilbao, J., "Selective production of olefins from bioethanol on HZSM-5 zeolite catalysts treated with NaOH." Applied Catalysis B: Environmental 2010, 97 (1-2), 299-306.

Rossetti, I.; Compagnoni, M.; Finocchio, E.; Ramis, G.; Di Michele, A.; Millot, Y.; Dzwigaj, S., "Ethylene production via catalytic dehydration of diluted bioethanol: A step towards an integrated biorefinery." Applied Catalysis B: Environmental 2017, 210, 407-420.

Sun, J.; Wang, Y., "Recent Advances in Catalytic Conversion of Ethanol to Chemicals." ACS Catal. 2014, 4 (4), 1078-1090.

Xin, H.; Li, X.; Fang, Y.; Yi, X.; Hu, W.; Chu, Y.; Zhang, F.; Zheng, A.; Zhang, H.; Li, X., "Catalytic dehydration of ethanol over post-treated ZSM-5 zeolites." Journal of Catalysis 2014, 312, 204-215.

Galadima, A.; Muraza, O., "Zeolite catalysts in upgrading of bioethanol to fuels range hydrocarbons: A review." Journal of Industrial and Engineering Chemistry 2015, 31, 1-14.

Phung, T. K.; Proietti Hernández, L.; Lagazzo, A.; Busca, G., "Dehydration of ethanol over zeolites, silica alumina and alumina: Lewis acidity, Brønsted acidity and confinement effects." Applied Catalysis A: General 2015, 493, 77-89.

Presentation titled "Development of 2-D Zeolite Materials for Energy Storage Production" Drs. Luther Mahoney, Laleh Emdadi, Zachary Dunbar, Dat Tran, and Ivan Lee, Frontier-Project, Technical Advisory Board (TAB) meeting at ARL in Adelphi, MD, Jun. 14, 2017.

\* cited by examiner

2%Zn-Pillared MFI:
HADDF of zeolite and EDS map of Zn (upper right inset) and O (lower right inset)

- Zn was present on zeolite particles – uniform amount across the particles as shown above

US 10,913,902 B2

PRODUCTION OF HIGH ENERGY-DENSE LIQUID HYDROCARBON FROM LOW ENERGY-DENSE AQUEOUS SOLUTIONS OF OXYGEN CONTAINING ORGANIC COMPOUND(S)

CROSS REFERENCE TO RELATED APPLICATION(S)

This application claims the benefit of U.S. Provisional Application No. 62/684,461 filed Jun. 13, 2018, which is incorporated by reference in its entirety herein for all purposes.

STATEMENT OF GOVERNMENT INTEREST

The invention described herein may be manufactured, used, and licensed by or for the United States Government without the payment of royalties.

BACKGROUND

Field of the Invention

Embodiments of the present invention generally relate to chemical reactions and apparatuses to yield liquid hydrocarbons.

Description of the Related Art

Production of liquid hydrocarbons from aqueous solutions including oxygen containing organic compound(s), such as aqueous ethanol as an example, is an exciting avenue to reduce logistic burden for the military, open paths to fully utilize biomass derived chemicals, and reduce the environmental impact of liquid hydrocarbon formation. Nonetheless, water removal is a major challenge to address in the conversion of aqueous biomass chemicals, such as aqueous ethanol. Likewise, an equally challenging task is preventing the solid-acid microporous catalyst from dealuminating under reaction conditions commonly encountered in production of liquid hydrocarbons from aqueous ethanol. There is no current method for efficiently separating water from ethanol before reacting over microporous zeolite catalyst.

SUMMARY OF INVENTION

Embodiments of the present invention include methods to convert an oxygen containing organic compound(s) to one or more water-free liquid hydrocarbons products. The methods make use of a catalytic process in a two-stage reactor system having a first reactor and a second reactor in series. Process design is described for effective conversion of aqueous low energy-dense aqueous solutions containing oxygen containing organic compound(s) to liquid hydrocarbons; the process design preferably employs the solid acid catalysts comprised of microporous aluminosilicates denoted as zeolites mixed with silicon carbide binder in series of two reactor system with capability of complete water removal.

The exemplary methods generally include:
  (i) in the first reactor, converting a feedstock of an aqueous solution of an oxygen containing organic compound to ethylene gas and water;
  (ii) allowing the resulting ethylene gas produced to flow from the first reactor to the second reactor;
  (iii) removing the water with a condenser between the first reactor and second reactor; and
  (iv) in the second reactor, converting the ethylene gas to one or more liquid hydrocarbons.

The novel processes disclosed herein address the gap in knowledge involving pre-separation of water and prevention of zeolite catalyst structure destruction and acid site deactivation, which has not been shown previously. These processes can be used in various heating chambers without extensive modifications, and the process design permits use of both quartz, stainless steel, and similar metal tubing for flow reactors. Additionally, the use of silicon carbide binder in the two-reactor process design prevents dealumination, thereby allowing the reaction to occur for long periods of time without deactivation of the catalyst. This scalable invention process design greatly enhances the liquid hydrocarbons production yield from low-energy dense aqueous oxygenates, which has not been done without using pre-concentrated ethanol before.

These and other, further embodiments of the invention are described in more detail, below.

BRIEF DESCRIPTION OF DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments, including less effective but also less expensive embodiments which for some applications may be preferred when funds are limited. These embodiments are intended to be included within the following description and protected by the accompanying claims.

DETAILED DESCRIPTION

Figure 1:
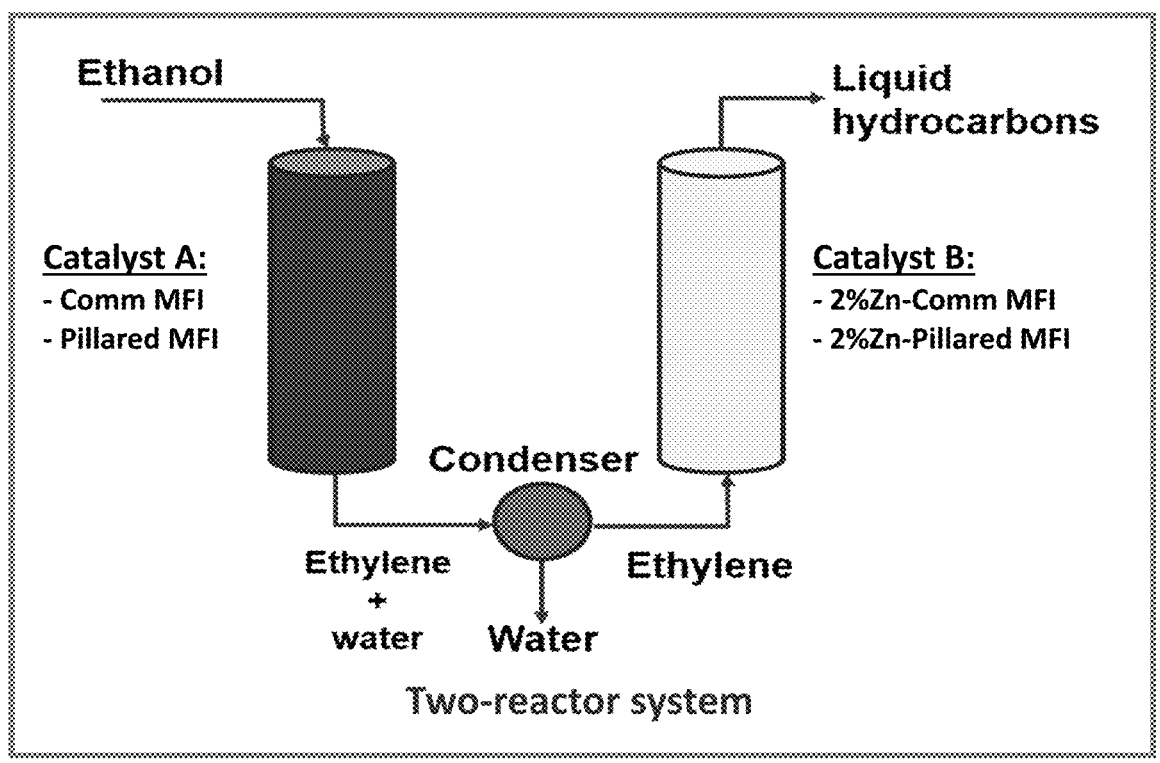
FIG. 1 is a schematic of a two-reactor system to convert ethanol/water solution to liquid hydrocarbons according to embodiments of the present invention.

FIG. 1 is a schematic of a two-reactor system to convert ethanol/water to liquid hydrocarbons used by the inventors in their initial experiments. The two-reactor in series system permits forming substantially pure liquid hydrocarbons with no deactivation from water that typically occurs.

The reactions in the first and second reactors are preferably be aided with catalysts to help initiate reactions, reduce energy, and/or provide better yields. The catalytic reaction in the first reactor may be performed using a zeolite-based catalyst. For instance, the zeolite-based catalyst comprises a three-dimensional (3D) mordenite framework inverted (MFI) catalyst or a two-dimensional (2D) lamellar MFI catalyst. Similarly, the catalytic reaction in the second reactor may be performed using a zeolite-based catalyst or a metal or metalloid-doped zeolite catalyst. As examples, the metal or metalloid doped zeolite catalysts here can include gallium (Ga) and zinc (Zn). And zeolite catalyst can be a 3-D MFI catalyst or a 2-D lamellar MFI catalyst. As a 2-D lamellar MFI zeolite catalyst, for instance, it can include both micropores of less than 1 nm and mesopores of 2-50 nm.

The catalysts in the first and second reactors can be both mixed homogeneously with a silicon carbide (SiC) binder, the silicon carbide binder preventing dealumination and desilication of the catalyst in the presence of water. Both alpha and beta forms of the SiC binder may be used. It has been found that the $\alpha$-SiC phase is more robust to temperature swings and typical reaction conditions compared to $\beta$-SiC. However, the $\alpha$-SiC phase has substantially lower surface area compared to the $\beta$-SiC phase. Also, $\alpha$-SiC has greater resistance under stressed reaction conditions compared to bentonite and alumina (form factor).

In some embodiments, the first reactor may configured to operate at a temperature of about 400-500° C. and at a pressure of 1 atmosphere or above. Similarly, the second reactor may be configured to operate at a temperature of about 400-500° C. and at a pressure of 1 atmosphere or above.

Figure 2:
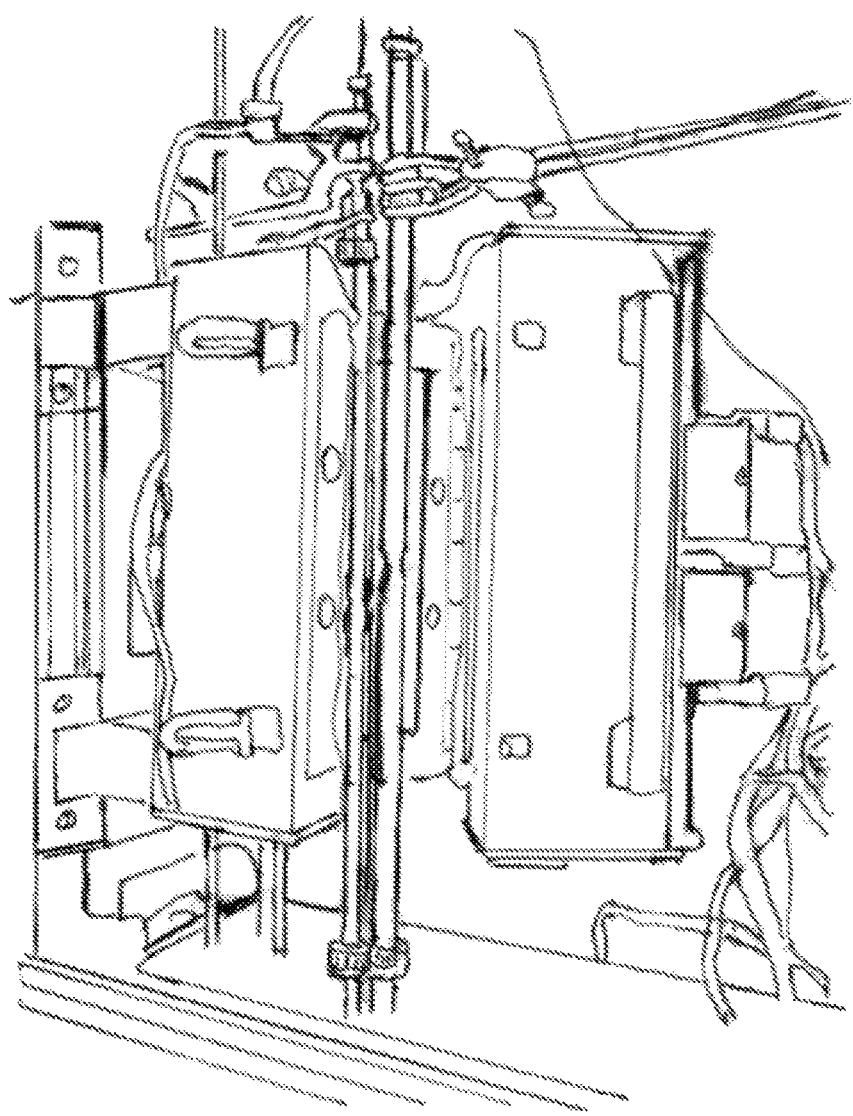
FIG. 2 is a sketch of a two-reactor system within the furnace according to an embodiment.

To facilitate heating, the two-reactor system is heated; it could be internally or externally heated. FIG. 2 is a sketch showing the two-reactor system used by the inventors placed within a furnace for instance. For the left reactor, the aqueous solution containing organic compound(s) can enters from the top and exits below the furnace to condenser. Ethylene gas enters the right reactor free of water at the top and passes through the composite catalyst bed exiting in the lower area.

As one non-limiting example, a 20% ethanol (by vol.) aqueous solution is fed into the first reactor (left), where Commercial MFI or Pillared MFI catalyst is packed and the reaction is operated at 400 or 500° C. under atmospheric pressure. Ethylene gas and water are formed and leave this reactor, where water is condensed out of system and ethylene gas goes to second reactor (right) and produce liquid hydrocarbons. By elimination of water, the liquid hydrocarbon yield increases significantly. The specific energy of our liquid hydrocarbon is measured by bomb calorimetry and its energy content is approximately 41 MJ/kg. Liquid hydrocarbon yield is determined by GC/MS and its yield is about 50%.

Inputs to Reactor 1.

The first reactor uses one or more oxygen containing organic compounds in an aqueous solution as an input (precursor). The oxygen containing organic compounds may be selected from alcohols, aldehydes, ketones, and carboxyl containing compounds, as non-limiting examples. Alcohols have a hydroxyl functional group (—OH). They include methanol $CH_3OH$, ethanol $C_2H_5OH$, propanol $C_3H_7OH$, and butanol $C_4H_9OH$, for instance. In some embodiments, the oxygenated-water mixture comprises ethanol in a concentration between 1% to 50% (by vol.) As an example, the aqueous solution may include about 20% (by vol.) ethanol aqueous solution. The flowrate for an 20% (by vol.) ethanol aqueous solution entering the first reactor might be about 0.75 mL/minute, for instance.

Fermentation process produces compounds in an aqueous media, such as ethanol. Ethanol concentration directly affects the bacteria (yeast) used in converting biomass from stiffening the cell membrane. At concentration above 10 to 14 volume percent cause the cell membrane to become fluidized leading to rigid cell walls, which eventually slows and kills the yeast. Therefore, efficient biomass conversion using yeast and similar microorganisms requires that 90 volume percent or more be aqueous phase. Pre-concentrating this dilute aqueous biomass broth containing ethanol is energy intensive using distillation and similar techniques. Energy required to obtain anhydrous ethanol increases exponentially from ethanol broth of 10 to 15 volume percent because of forming an azeotropic phase with water. Upwards of 40% of the energy required to convert ethanol is in the dehydration step. Therefore, many research studies focus on using solar distillation via solar concentrator to lower the energy burden for pre-concentrating ethanol in the range of anhydrous grade, which is needed in various applications including automobile fuel blending. The novel processes of the present invention eliminate the need for pre-concentrating aqueous broth solutions containing organic oxygen containing molecules.

Aldehydes have a carbonyl center functional group (—CHO). One example of an aldehyde is propanal having a formula of $CH_3CH_2CHO$. Ketones having a RC(=O)R' structure, where R and R' can be a variety of carbon-containing substituents. Acetone is the simplest ketone having a formula $(CH_3)_2CO$. Butanone, also known as methyl ethyl ketone (MEK), has the formula $CH_3C(O)CH_2CH_3$. The carboxyl group (—COOH) has both a carbonyl and a hydroxyl group attached to the same carbon atom. For instance, carboxylic acid contains a carboxyl group having the general formula of R—COOH. A carboxylate is a salt or ester of a carboxylic acid. Carboxylate salts have the general formula $(RCOO)_n$, where M is a metal and n is 1, 2, . . . ; and carboxylate esters have the general formula RCOOR' where R and R' are organic groups and R'≠H. Other compounds including a carboxyl group include acetate $CH_3COO(—)$, n-propyl acetate $CH_3COOCH_2CH_2CH_3$, and n-butyl formate $HCOO(CH_2)_3CH_3$, for instance.

Output(s) of Reactor 1.

Ethylene gas ($C_2H_4$) is the desired and intended product of reaction 1. However, other intermediates are likely formed, with their formation being dependent on the precursors and/or the reaction conditions. The molecular lengths of the oxygen containing organic compound has an impact of the reactions. For instance, the precursors with different lengths will form different intermediates and likely form various hydrocarbons. Through use of a manual gas tight syringe, it was found that no other intermediates were formed, especially when the reaction is below 400° C. One of the intermediates that forms is diethyl ether. For methanol, one of the intermediates in dimethyl ether. Inadequate heat will produce ethers as intermediates. Further examples include propanol and butanol. It is noted that alcohols beyond four carbons become less soluble in aqueous phase; the same holds for aldehydes beyond butanal due to hydrophobic interactions; the ketone family also follows this trend four carbons and below. However, longer chain carboxylic acids are barely miscible in water; therefore, only acetic acid has been studied regularly.

According to embodiments, the one or more liquid hydrocarbons produced by the novel methods may include, but are not necessarily limited to: substituted mono-benzenes (benzene, toluene, o-xylene, p-xylene, m-xylene, ethylbenzene, 1-methylethylbenzene, propylbenzene, 1-ethyl-4-methylbenzene, 1,2,4-trimethylbenzene, 1,2,3-trimethylbenzene, 1-methyl-3-(1-methyl-ethyl)-benzene, 1-propenyl-benzene, 1,3-diethylbenzene, 1-methyl-3-propylbenzene, 1,2-diethylbenzene, 2-ethyl-1,4-dimethylbenzene, 2-ethyl-1,4-dimethylbenzene, 1-ethyl-2,4-dimethylbenzene, 2,4-dimethylstryrene, 1-methyl-indan, 1,2,4,5-tetramethylbenzene, 2,4-dimethyl styrene, 1,4-diethyl styrene, 1,4-dimethyl-2-methylbenzene, 1,3-diethyl-5-methyl-benzene, 2,3-dihydro-4,7-dimethyl-1H-indene, 2,3-dihydro-1,6-dimethyl-1H-indene, 1-methyl-3-(1-methyl-2-propyl)-benzene, 2-ethyl-2,3-dihydro-1H-indene) and polyaromatic (1,2,3,4-tetrahydro-naphthalene, 2-methyl-napthalene, 1,2,3,4-tetrahydro-2,6-dimethyl-naphthalene, 2-ethyl-naphthalene, 2,6-dimethyl-naphthalene, or 1,5-dimethyl-naphthalene, or 1,6,7-trimethyl-naphthalene) compounds.

The amount of gaseous products besides ethylene are believed to be fairly low, such as collectively less than about 1% (by vol.) in total. They may include, in decreasing amounts, when using the composite Commercial-MFI-SiC: Propene, i-butane, 1-butene, trans-2-butene, isobutylene, 1-pentene, cis-2-pentene, and trans-2-pentene. When using pure Commercial-MFI, the collective amount of gaseous products besides ethylene may include, in decreasing amounts: propene, methane (cracking product), i-butane, 1-butene, isobutylene, 1-pentene, and cis-2-pentene.

The Condenser and Water-Free Input to Reactor 2.

The condenser functions to remove the water vapor, thereby preventing deactivation of the catalyst in the second reactor. It may be a glass condenser, for example. The gaseous product(s) leaving the condenser should be substantially free of water; otherwise, the water vapor would deactivate the catalyst in the second reactor. Literature suggests that the water acts as strong nucleophile and blocks the strong acid sites in the zeolite, so the reaction occurs poorly, if at all.

The term "water-free" as used herein means less than about 0.5% (by vol.) in any solution or mixture. Thus, 99.5% (by vol.) or more of the water is condensed out of reactor system with the condenser. It is noted that water vapor would deactivate the second catalyst bed and bind to the strong acid sites needed for converting small gaseous hydrocarbons to larger liquid hydrocarbons. The key to yielding relatively water-free hydrocarbons is to judiciously control the temperature that the condenser apparatus is set to. For example, −10° C. set point will condense more water vapor than 0° C. The chiller set point was −10° C., as an example.

Figure 3:
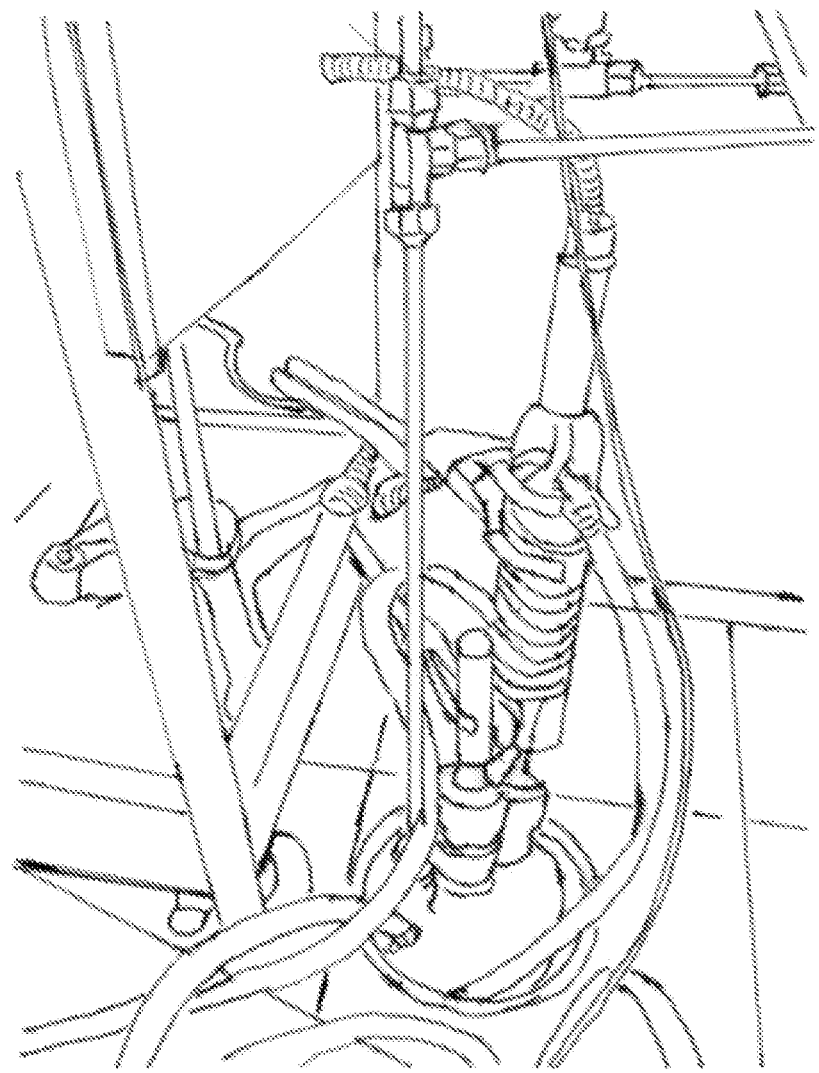
FIG. 3 is a sketch of a glass condenser used in embodiments.

FIG. 3 is a sketch showing the Graham Pyrex glass condenser used by the inventors in their experiments and embodiments. It is shown in the center in this sketch. The glass condenser is 200 mm water jacket with entering fitting 19/38 glass joint and exiting glass joint fitting 20/40 connected with three neck 500 mL round-bottom flask for collection of liquid water. The entering gas products from reactor one pass through the 12 mm outer diameter glass tube in the condenser with the coiling providing ample opportunity to convert the water vapor to liquid phase water. The exiting water free stream is sealed with silicon grease for the glass joints to prevent air infiltration.

The exiting gas from the first reactor passes from the flexible stainless steel tubing through the green rubber stopper into the upper portion of the glass condenser. The gas products, including water vapor, travel downward in the spiral water jacket with ethylene-glycol water mixture circulating around the 12 mm out diameter spiral glass tube. The exiting liquid water passes into the 500 mL round-bottom flask for storage. The remaining gaseous products exit the round-bottom flask. The left stainless steel takes the exiting gaseous products to the second reactor in series.

Thus, the ethylene gas (and other molecules) enter the second reactor substantially free of water. Lack of water in the second reactor can be inferred because water deactivates zeolite strong acid sites from nucleophilic hydrogen bonding, thereby preventing liquid hydrocarbons from forming readily.

It may also be favorable to include an additional condenser at the output of the second reactor to remove water from its output.

Outputs of Reactor 2.

The hydrocarbons referred to herein as being in a liquid state are so at room temperature (25° C.) and atmospheric pressure. In some embodiments, the liquid hydrocarbon yield is approximately 50% (by vol.) or more. As a sidenote, similar to gasoline put in a vehicle, if the container (vessel) is left open, then, the liquid hydrocarbons will typically evaporate over time because some of the liquid hydrocarbons have a low vapor pressure.

Contact time will also determine the product distribution. Shorter contact time favors forming small gaseous hydrocarbons. However, longer contact time periods favor greater interaction with the catalyst, thereby increasing the probability of forming larger hydrocarbons and possibly carbonaceous species. The goal is to have the shortest contact time and still produce the desired hydrocarbons.

Lower reaction temperatures favor forming intermediates, such as diethyl ether, from aqueous ethanol solution. Higher reaction temperatures favor forming desired liquid product and potentially carbonaceous species.

Exemplary chemical equations.

Below are some exemplary chemical equations for the reactions which can take place in reactors 1 and 2:

$$C_2H_5OH(aq.) \rightarrow [C_2H_4] + H_2O \tag{1}$$

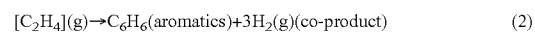
$$[C_2H_4](g) \rightarrow C_6H_6(aromatics) + 3H_2(g)(co\text{-}product) \tag{2}$$

Addition chemical balanced chemical equations for aqueous organic compounds using zeolites:

Inadequate heating (too low reaction temperature):

Alcohols:

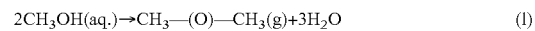
$$2CH_3OH(aq.) \rightarrow CH_3\text{---}(O)\text{---}CH_3(g) + 3H_2O \tag{1}$$

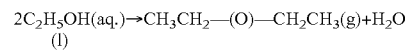
$$2C_2H_5OH(aq.) \rightarrow CH_3CH_2\text{---}(O)\text{---}CH_2CH_3(g) + H_2O \tag{1}$$

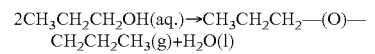
$$2CH_3CH_2CH_2OH(aq.) \rightarrow CH_3CH_2CH_2\text{---}(O)\text{---}CH_2CH_2CH_3(g) + H_2O(l)$$

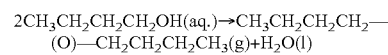
$$2CH_3CH_2CH_2CH_2OH(aq.) \rightarrow CH_3CH_2CH_2CH_2\text{---}(O)\text{---}CH_2CH_2CH_2CH_3(g) + H_2O(l)$$

Adequate Reaction Temperature:
Alcohols:

$$2CH_3OH(aq.) \rightarrow C_2H_4(g) + 2H_2O(l)$$

$$C_2H_5OH(aq.) \rightarrow C_2H_4(g) + H_2O(l)$$

$$CH_3CH_2CH_2OH(aq.) \rightarrow C_3H_6(g) + H_2O(l)$$

$$CH_3CH_2CH_2CH_2OH(aq.) \rightarrow C_4H_8(g) + H_2O(l)$$

Aldehydes:

$$3CH_3CHO(g) \rightarrow C_6H_6(benzene)(l) + 3H_2O(l)$$

$$3CH_3CH_2CHO(aq.) \rightarrow C_9H_{12}(1,3,5\text{-trimethylbenzene})(l) + 3H_2O(l)$$

$$3CH_3CH_2CH_2CHO(aq.) \rightarrow C_{12}H_{18}(1,3,5\text{-triethylbenzene})(l) + 3H_2O(l)$$

Ketones:

$$3CH_3COCH_3(aq.) \rightarrow C_9H_{12}(1,3,5\text{-trimethylbenzene})(l) + 3H_2O(l)$$

$$3CH_3COCH_2CH_3(aq.) \rightarrow C_{12}H_{18}(1,3,5\text{-triethylbenzene})(l) + 3H_2O(l)$$

Carboxylic Acids:

$$5CH_3COOH(aq.) \rightarrow C_6H_6(benzene)(l) + 2H_2O(l) + 4CO_2(g) + 5H_2(g)$$

$$3CH_3COOH(aq.) \rightarrow i\text{-}C_4H_8(g) + 2H_2O(l) + 2CO_2(g)$$

Esters:

$$CH_3COOCH_2CH_2CH_3(aq.) \rightarrow C_8H_{10}(xylenes)(l) + 5H_2(g) + 2CO_2(g)$$

Generalized Chemical Equations for higher acyclic organic compounds
Alcohols/Ethers:

$$(n+1)C_nH_{2n+2}O \rightarrow nC_nH_{2n+2} + (n+1)H_2O + nC \quad (1)$$

$$C_nH_{2n+2}O \rightarrow C_nH_{2n} + H_2O \quad (2)$$

$$(5+n)C_nH_{2n+2}O \rightarrow nC_5 + nH_{2n+4} + (5+n)H_2O + 3nH_2 \quad (3)$$

Ketones/Aldehydes:

$$(n+1)C_nH_{2n}O \rightarrow (n-1)C_nH_{2n+2} + (n+1)H_2O + 2nC \quad (4)$$

$$nC_nH_{2n}O \rightarrow (n-1)C_nH_{2n} + nH_2O + nC \quad (5)$$

$$(5+n)C_nH_{2n}O \rightarrow (n-1)C_5 + nH_{2n+4} + (5+n)H_2O + (5+n)C + 3(n-1)H_2 \quad (6)$$

Carboxylic Acids:

$$2C_nH_{2n}O_2 \rightarrow C_{2n-1}H_{2n+2}O + CO_2 + H_2O \quad \text{(Symmetrical ketone)}$$

Esters:

$$2C_nH_{2n}O_2 \rightarrow C_{2n-3}H_{2n+2}O + CO_2 + CH_3OCH_3 \quad \text{(Symmetrical ketone and ether)}$$

Energy Balance.

Figure 4:
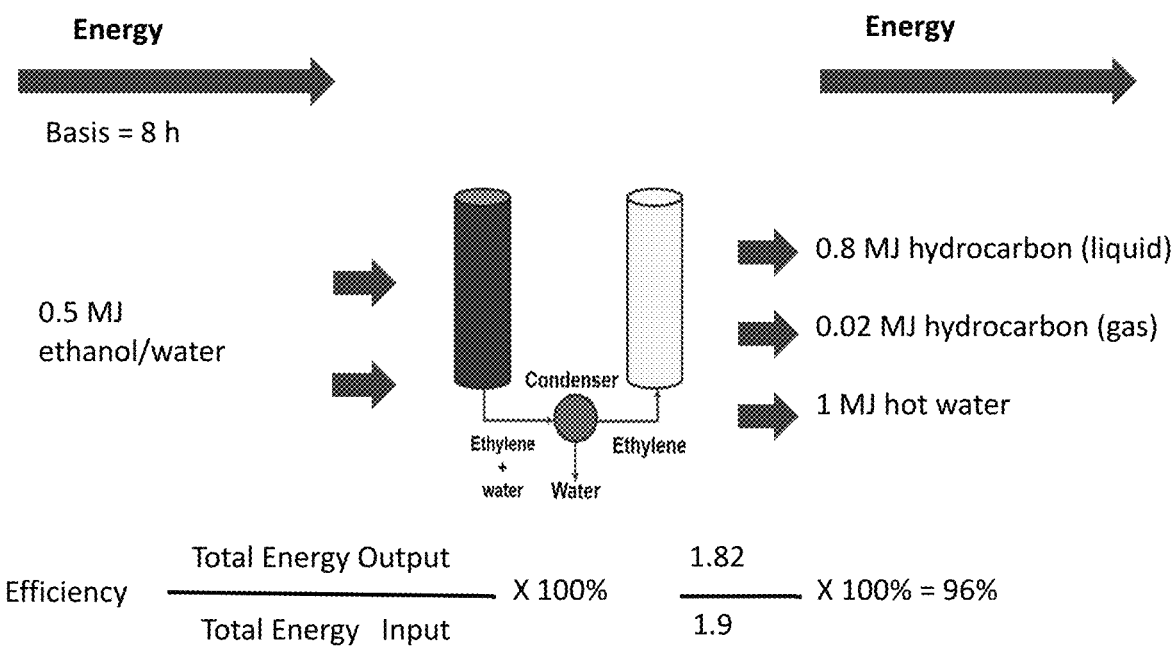
FIG. 4 details the energy balance of 20% aqueous ethanol (80% water) to hydrocarbons according to embodiments.

FIG. 4 is a schematic showing the energy balance for the two reactor system specifically using 20% aqueous ethanol (80% water) as an example. It has a combined efficiency of 96%. The balanced chemical equations with starting materials, such as alcohols, aldehydes, ketones, carboxylic acids, and esters, from the fermentation of lignocellulose are provided in addition to generalized balanced chemical equations for acyclic organic compounds.

Role of Catalysts.

Since the development of microporous zeolites in the 1970s for conversion of methanol, there has been much interest in converting low energy-dense aqueous oxygenates to hydrocarbons. Microporous mordenite framework inverted (MFI) zeolites have been explored to be the most effective catalyst for methanol conversion reaction due to the narrow pore diameter and specific pore channel structure providing a sieving effect with small reactant molecules entering and exiting the zeolite pore network. MFI zeolite is comprised of several pentasil units that provide the sieving effect. MFI zeolite has a three-dimensional pore network with pentasil structure. MFI pore diameter is close to 0.5 nm in contrast to larger pore zeolites, such as zeolite Y. Common synthesis methods for microporous MFI include hydrothermal autoclave and microwave-assisted hydrothermal. In addition to microporous three-dimensional zeolites, another recent class of zeolites have been developed with hierarchical pore structures include SSZ-13 from using surfactants to form aggregates of mesopores. These hierarchical zeolites are comprised of microporous and mesoporous channels. Introduction of mesopores into the zeolite structure can be accomplished by removal of framework atoms, such as in dealumination or desilication. Uniformity of mesopore sizes as a result of framework atoms removal can be challenging. Other methods of incorporating mesopores to zeolite structure include using surfactants, hard templates, and soft templates with the advantage of forming meso-/microporous zeolites having more uniform mesoporosity. Two-dimensional zeolite nanosheets or lamellar zeolites are an innovative type of meso-/microporous zeolites providing high external surface areas and high accessibility to zeolite active sites. Use of meso-/microporous zeolites reduces the diffusion limitations that occur in three-dimensional microporous zeolites for bulky molecules, thereby increasing the catalyst performance (activity, selectivity, and lifetime). For example, methanol conversion and selectivity was improved when using these two-dimensional zeolites. Furthermore, the amount of catalyst deactivating internal coke decreases while using a zeolite containing hierarchical pore network, such as meso-/microporous two-dimensional zeolite, as shown in previous reaction outcomes. In essence, use of a meso-/microporous two-dimensional zeolite favor increase diffusion of reactant molecules and lower mass-transfer, so the hierarchical zeolite lasts longer under reaction conditions.

Besides the sieving effect of microporous zeolites, other factors that affect the conversion, selectivity, and product yield of the hydrocarbon production reaction include the Si/Al ratio of the zeolite, zeolite identity, metal dopant type, metal dopant loading, metal dopant dispersion, metal dopant location inside pores or on surface of zeolite particles, reaction temperature, weight hourly space velocity (WHSV), contact time (residence time), and binder (dilutant) identity. These ten factors are categorized as catalyst, catalyst modification, and reaction engineering. The Si/Al ratio controls the amount of framework aluminum ions that produce the H-form zeolite catalyst. Therefore, the resulted Brønsted acid sites of the zeolite catalyst is dictated by the Si/Al ratio. Zeolite structure and pore geometry also influence the lowest Si/Al ratio can be obtained with keeping the zeolite structure still intact, such as with meso-/microporous zeolites. Catalyst modification using metal dopant cations to modulate the number and strength of Brønsted acid sites forms a bifunctional zeolite material since these metal active sites may act as new active sites. Using metal dopant cations introduces Lewis acidity at the expense of losing Brønsted acidity, which effectively remove hydrogen co-product in conversion of aqueous solutions of oxygen containing organic compound(s) to liquid hydrocarbons, so the liquid hydrocarbon yield is increased. Reaction engineering of the conversion of dilute aqueous ethanol to liquid hydrocarbons involves optimizing the reaction temperature, WHSV, contact time, and use of binder. WHSV and contact time require careful adjustment to increase the yield of liquid products, which commonly results in reducing inert gas flowrate and increasing the catalyst bed length.

Reaction temperature ranges vary from 200° C. to 500° C. dependent on the organic molecule identity being studied. At lower reaction temperatures, such as 200° C. to 400° C., with aqueous solutions of oxygen containing organic compound(s) the products formed are intermediates. For example, aqueous methanol at 200° C. to 300° C. will convert to dimethyl ether intermediate readily without proceeding to produce ethylene olefin. Similarly, aqueous ethanol converts to diethyl ether predominantly when the reaction temperature is 200° C. to 300° C. especially on zeolite catalysts not modified with dopant metals, for example iron. Furthermore, the higher reaction temperatures 400° C. and above favor forming liquid organic molecules including aromatics. The contact time has been studied previously with WHSV from 0.07 $h^{-1}$ to 1 $h^{-1}$ producing aromatics and other products in addition to gas phase organic compounds within the water mixture. Therefore, reduced WHSV values will produce liquid organic compounds with the aqueous mixture at the expense of gaseous olefins, such as ethylene. Binder interactions have not been investigated greatly. However, it is suggested that the binder identity and amount affect the conversion and product selectivity. Aqueous ethanol reaction with bentonite showed that increasing amounts of binder favored forming gaseous olefins, such as ethylene, with the conversion decreasing. Other oxygen containing organic compound(s) reactions indicate that the binder has a major influence on the product selectivity and yield. So, optimizing the reaction temperature requires adjusting the WHSV and contact time in conjunction the use of a binder to maximize the liquid product yield.

It has been previously suggested that zeolites under optimal process conditions can produce olefins from oxygenates including short and longer chain aqueous alcohols. Many conventional processes start with fairly concentrated alcohols in the range of 56 volume % to 100 volume %. Highly concentrated alcohols like these are obtained from fermentation which require energy intense purification techniques, such as distillation, molecular sieve adsorption, vapor permeation, or pervaporation. Use of highly concentrated oxygenate solutions is thus not economically practical or feasible. Also, the fermentation process can produce from biomass oxygenates and oxygenate intermediates, such as ketones, aldehydes, carboxylic acids, and esters, depending on the starting biomass matrix. Components of lignocellulose biomass include cellulose, hemicellulose, and lignin, and the composition of lignocellulose varies from biomass starting materials. Therefore, the fermentation process using microorganisms can produce various aqueous solutions of oxygen containing organic compound(s) depending on the lignocellulose biomass matrix.

Lower energy dense aqueous ethanol mixtures from 2 volume % to 20 volume % have been evaluated by others in the past, and more particular, they have indicated that light olefins including ethylene (ethene) can be produced efficiently in dilute ethanol of 2 volume % to 19 volume %, such as derived in bio-ethanol production. However, the challenges of catalyst stability over reaction periods beyond 48 h have not been readily considered. The challenge has been the prevention of aluminum leaching from the zeolite catalyst especially when dilute alcohols, such as ethanol, are used at elevated temperatures of 400° C. and above. Aguayo et al. showed that using 56 volume % ethanol (44% water), commercially available MFI as catalyst lost its stability after 1 hour with reaction temperature of 450° C. and higher due to irreversible dealumination. See Aguayo, A. T.; Gayubo, A. G.; Tarrio, A. M.; Atutxa, A.; Bilbao, J., "Study of operating variables in the transformation of aqueous ethanol into hydrocarbons on an HZSM-5 zeolite." *Journal of Chemical Technology &Biotechnology*, 2002, 77 (2), 211-216. At 500° C., even without any water in ethanol mixture, they noted zeolite dealumination. Bentonite, alumina, silica, or quartz sand have been previously used as a binder, which hinder the reactions. Silicon carbide as a binder with α-SiC foam or β-SiC foam has been explored as a support to zeolites. It have been suggested that with β-SiC the zeolite durability is marginally increased. But, the inventors are unware of others exploring low volume percent aqueous oxygenates using β-SiC as a support to the zeolite. Furthermore, the phase of SiC influences the textural properties, thermal stability, and reaction durability. The β-SiC has surface area values of 100 $m^2$/g to 150 $m^2$/g. In contrast, the α-SiC has surface area values ranging from 1 $m^2$/g to 10 $m^2$/g. Generally, the high surface area of a support is favorable in catalytic reactions, but the porous nature of β-SiC comes with reduce thermal and reaction durability especially at higher reaction temperatures. Likewise, the β-SiC provides little protection to the zeolite under reaction relevant reaction conditions needed with aqueous oxygenates. Alpha silicon carbon does not suffer from thermal stability and reaction durability, which provides a way to protect the zeolite form harsh reaction conditions present with aqueous oxygenates. The inventors of the present invention explored the use of alpha silicon carbide (α-SiC) as a binder and heat transfer agent when mixed, pressed, and sieved using three-dimensional Commercial-MFI, and two-dimensional meso-/microporous lamellar MFI zeolite. Also, the inventors explored the use of metal dopant cations (such as Zn) to increase the yield of liquid hydrocarbon products. They discovered that use of α-SiC combined with zeolite catalysts used in a two reactor system in series is effective in converting 20 volume % ethanol (80% water) to 98-99% ethene gas followed by conversion of ethene gas to liquid hydrocarbons in the second reactor at a 500° C. furnace set point. With use of a two reactor system in series, dilute aqueous ethanol can be converted to pure liquid hydrocarbons by removing the water before feeding to the second reactor, thereby preventing deactivation of the composite catalyst. Finally, composite metal doped (Zn) catalyst in the second reactor produces yield of liquid hydrocarbons of up to 50%; in another words, from one-gallon of low energy dense 20% aqueous ethanol (5 MJ/kg), 222 mL energy dense pure liquid hydrocarbons can be obtained with a heating value of 41 MJ/kg in an 8 h reaction period, which can be scaled to desired liquid hydrocarbon production values.

Preparation and Characterization of Catalysts.

Catalyst synthesis, catalyst characterization, and process design details are discussed for producing energy dense liquid hydrocarbons from aqueous solutions including oxygen containing organic compound(s). The zeolite catalysts specifically studied by the inventors were as follows: Commercial-MFI; 2%-Zn-Commercial-MFI; Lamellar-MFI; and 2%-Zn-Lamellar-MFI. Commercial-MFI CBV 8014, Si/Al=40, was purchased from Alfa-Aesar.

The meso-/microporous two-dimensional lamellar MFI can be synthesized using a dual-template synthesis recipe of 30$Na_2O$/1$Al_2O_3$/100$SiO_2$/10 $C_{22-6-6}$/5TPAOH/4000$H_2O$/18$H_2SO_4$ involving the following steps. First, 0.7 g of sodium hydroxide (NaOH, 98.8%) was dissolved in 3.0682 g DI water followed by dissolving 0.4 g of sulfuric acid ($H_2SO_4$, 96%) in 4.2 g of DI water. The NaOH solution was added dropwise into the $H_2SO_4$ solution under vigorous stirring. After that, 0.1898 g of aluminum sulfate hydrate ($Al_2(SO_4)_3 \cdot 16H_2O$, 98%) was added to the reaction-mixture. Then, 0.765 g of tetra-n-propylammonium hydroxide (TPAOH, 40 wt. %) and 6.27 g of tetraethyl orthosilicate (TEOS, 98%) were added sequentially to the mixture followed by 20 h of vigorous stirring at room-temperature. The reaction-mixture was then mixed with polyquaternary surfactant ($C_{22-6-6}$) solution that was prepared by dissolution of 2.1876 g surfactant in 15 g DI water at 60° C. After 2 h of continuous stirring under ambient conditions, the formed gel was placed into a Teflon-coated stainless-steel autoclave followed with 5 days of rotation (~30 rpm) in a rotating oven at 150° C. for crystallization. Once cooled to room-temperature, the zeolite product was filtered, washed extensively with DI water, and dried overnight at 70° C. The obtained sample was denoted as Lamellar MFI. The lamellar zeolite sample was then calcined in air by increasing the temperature from ambient temperature to 600° C. at 0.0242° C. $s^{-1}$ and holding for 6 h to remove the organic templates (TPAOH and $C_{22-6-6}$).

The polyquaternary ammonium surfactant was synthesized as follows. First, 18.5 g of 1-bromodocosane and 86 g of N,N,N',N'-tetramethyl-1,6-diaminohexane were dissolved in 500 mL of acetonitrile/toluene mixture of 1:1 volumetric ratio within a dry room. The reaction mixture was heated under low moisture conditions in dry room for 10 h at 70° C. under magnetic stirring at 500 rpm. After cooling from 70° C. to ambient temperature, the precipitated product was filtered, washed extensively with diethyl-ether (DEE), and dried in a vacuum oven at 70° C. overnight. The dried product (28 g) and 12.5 g of 1-bromohexane were dissolved in 150 mL of acetonitrile and refluxed at 85° C. under magnetic stirring at 500 rpm for 10 h in a dry room fume hood. After the reaction-mixture had cooled to room-temperature, the precipitate was washed extensively with DEE, and dried in a vacuum oven at 70° C. overnight. The as-synthesized surfactant $[C_{22}H_{45}-N^+(CH_3)_2-C_6H_{12}-N^+(CH_3)_2-C_6H_{13}]Br_2$ was designated as $C_{22-6-6}$. The as-calcined dual template synthesized lamellar MFI zeolite sample was ion-exchanged three times using 1 M aqueous ammonium nitrate ($NH_4NO_3$) (weight ratio of zeolite to $NH_4NO_3$ solution=1:10) at 80° C. for 12 h, and subsequently, collected by centrifugation, washed with deionized water three times, and dried at 70° C. overnight. No ion-exchange process was applied to the Commercial MFI since it was purchased in the $NH_4^+$-form. Lamellar and commercial MFI zeolite samples in their $NH_4^+$-form were calcined by increasing the temperature from ambient temperature to 550° C. at 0.0242° C. $s^{-1}$ and holding for 4 h to thermally decompose $NH_4$ to $NH_3$ and $H^+$ and provide the zeolite in its $H_+$-form.

The zinc loading was done by wet impregnation technique using the zinc metal salt solution containing the zinc amount equal to 0.02 g, 1 mL of DI water, and 1 mL of ethanol that was added to 0.98 g of zeolite in its $H^+$-form. The zinc metal salt used was zinc nitrate ($Zn(NO_3)_2 \cdot xH_2O$), with 99% purity from Alfa-Aesar. After evaporation of the solvents in an oven at 40° C. for 24 h, the zinc impregnated zeolite was subjected to calcination at 580° C. for 8 h.

Figure 5A:
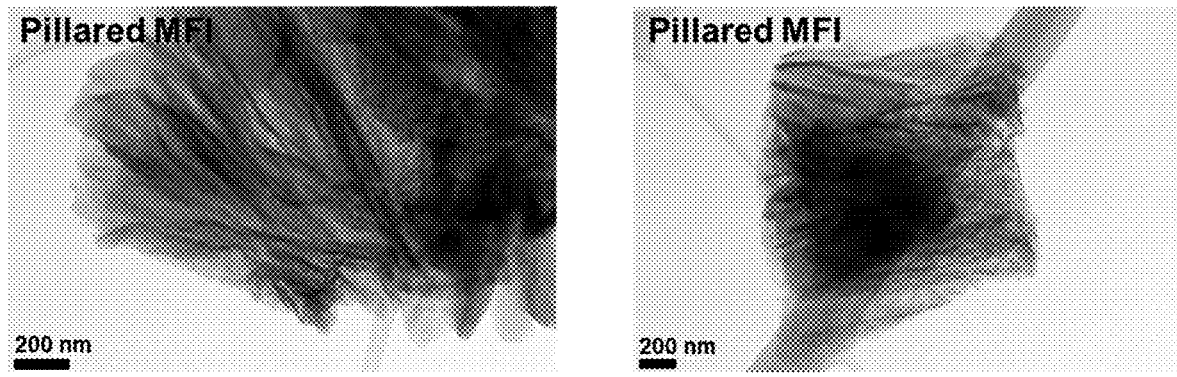
FIG. 5A is a magnified photograph of a pillared MFI (Lamellar MFI) TEM-HAADF shows nanosheet structure used in embodiments.
Figure 5B:
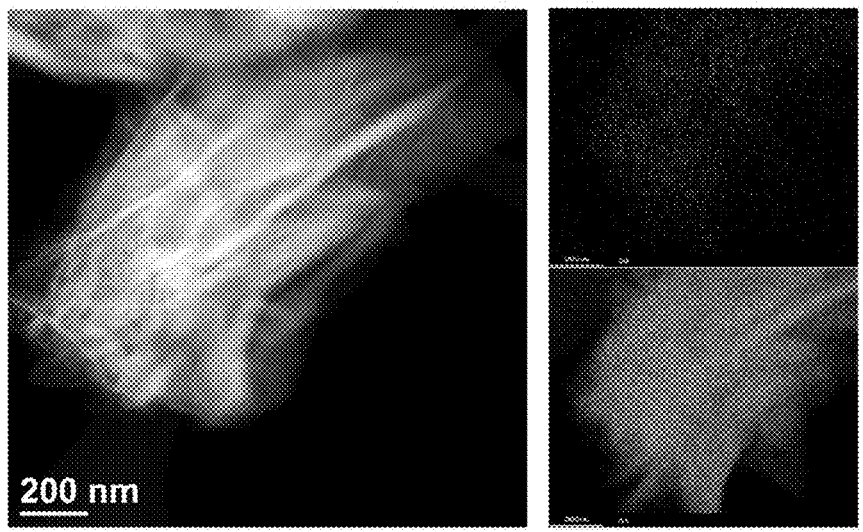
FIG. 5B is a magnified photograph of a Pillared MFI (Lamellar MFI) TEM-HAADF shows nanosheet structure used in embodiments.
Figure 6:
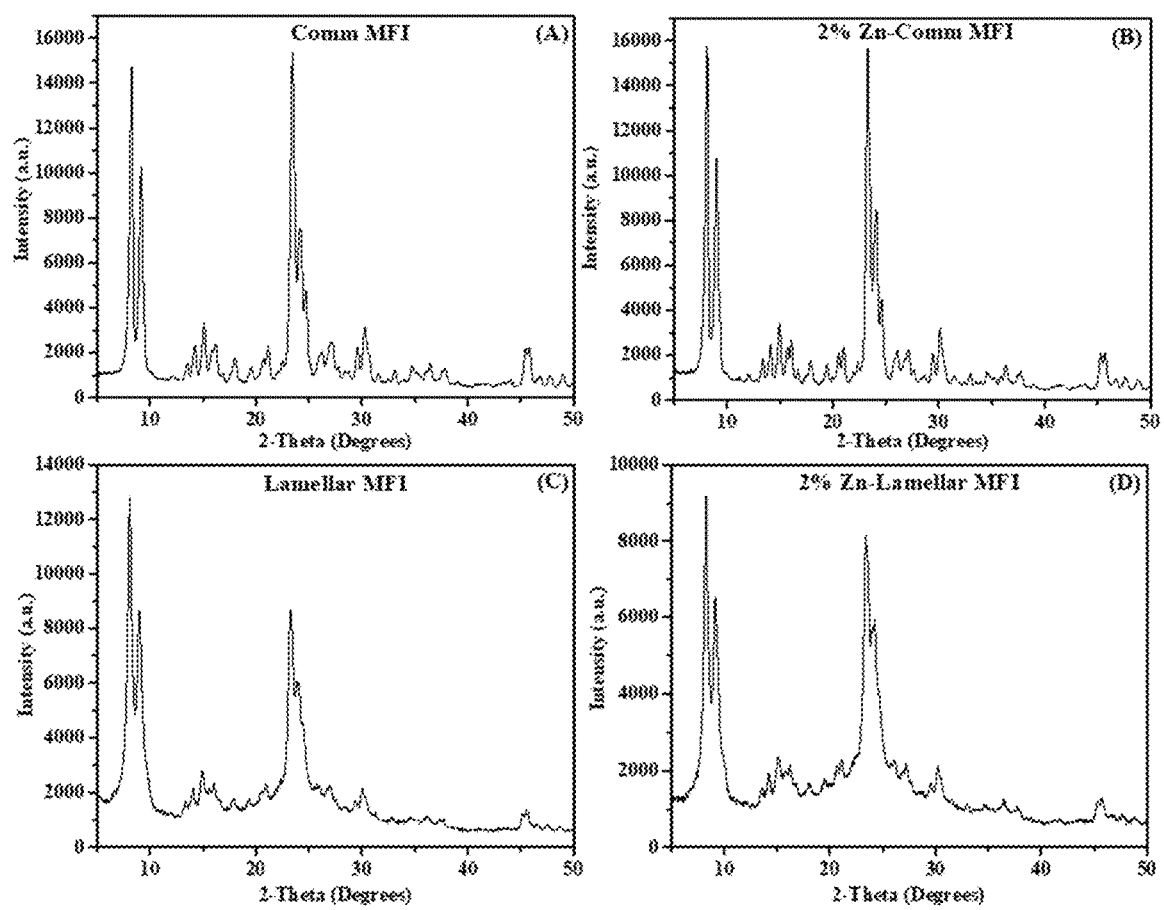
FIG. 6 shows side-angle powder X-ray diffraction images of (A) Comm MFI, (B) 2% Zn-Comm MFI (upper row); (C) Lamellar MFI, and (D) 2% Zn-Lamellar MFI (bottom row).

The four above mentioned zeolite catalysts were characterized using powder transmission electron microscopy-high angle annular dark field (TEM-HAADF), powder X-ray diffraction (XRD), argon and nitrogen physisorption, UV-Visible diffuse reflectance spectroscopy, thermogravimetric analysis (TGA), pyridine adsorption Fourier-transform-infrared (FT-IR) spectroscopy, and inductively coupled plasma-atomic emission spectroscopy (ICP-AES) as described in subsequent manuscript. The TEM-HAADF and XRD characterization results suggested the formation of highly crystalline zeolite materials with desired structures, as shown in FIGS. 5A, 5B, and 6.

Figure 7A:
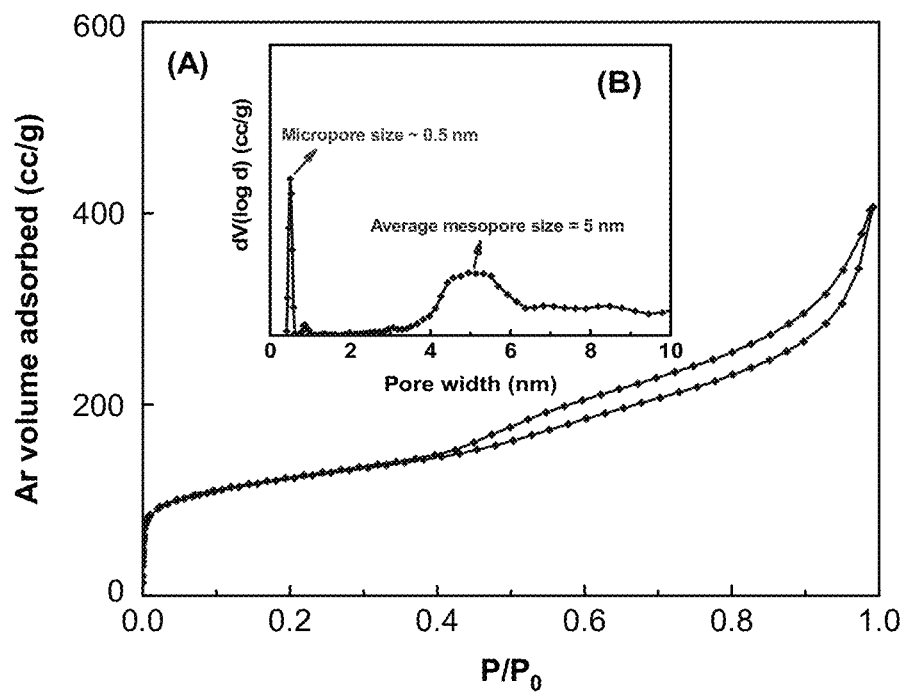
FIG. 7A shows an Ar adsorption-desorption isotherm (A) and the corresponding pore size distribution (B) as derived from Ar sorption (NLDFT on the adsorption branch) of lamellar MFI zeolite.
Figure 7B:
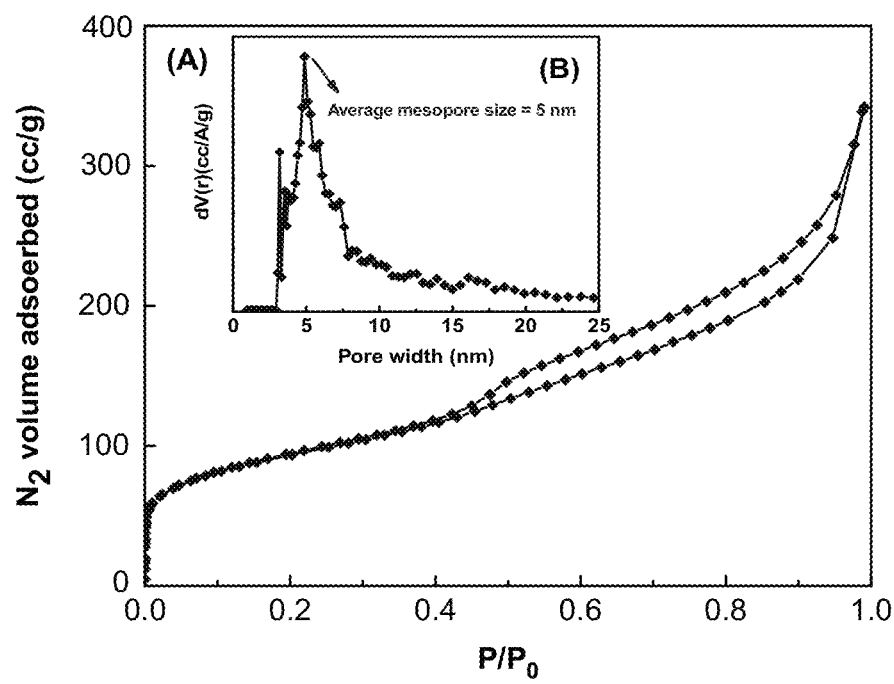
FIG. 7B shows a $N_2$ adsorption-desorption isotherm (A) and the corresponding pore size distribution (B) as derived from $N_2$ sorption (NLDFT on the adsorption branch) of lamellar MFI zeolite.

FIG. 7A is an argon physisorption analysis of Lamellar-MFI shows the isotherm typical of Type (IV) mesoporous materials with a H2 hysteresis loop suggesting plate-like pores. The pore size distribution in FIG. 7A inset indicates that a combination of micropores and mesopores had formed in the Lamellar-MFI 2D meso/microporous zeolite. FIG. 7B shows the complementary nitrogen physisorption results for Lamellar-MFI zeolite also with Type (IV) isotherm and pore size distribution inset of 5 nm in the mesoporous range, which proves that the Lamellar-MFI zeolite has a combination of micropores and mesopores. Following the characterization process, the activated zeolite was mixed with α-SiC (2 μm, 99.8% by metals basis, Alfa-Aesar) at the following mass ratios: 50% zeolite/50% α-SiC, and 25% zeolite/75% α-SiC. After grinding the fine powder mixture by mortar and pestle, the composite mixture was subjected to pressure of 6,000 to 10,000 psi using a Carver 13 mm stainless steel die and Carver hydraulic press. The pressed pressure was held for 1 minute followed by release of the stainless steel die. The composite pellets were grinded and sieved by mortar and pestle to from 250 m to 500 m particle for use in reactor one with 20% aqueous ethanol (80% water). Sieving of particles from 500 m to 2000 m particle was used in reactor two, respectively.

EXAMPLES

The process involves loading the composite sieved catalyst into two separate quartz reactors to form packed bed using quartz wool plug of 1 cm length. The quartz flow reactor used for the reactions was 58.5 cm long with an inner diameter of 10 mm an outer diameter of 13 mm. The quartz wool plug was inserted into the narrowed opening that had an inner diameter of 7 mm at the center of the quartz tube. The catalyst bed length was approximately 1.0 cm (mass: 0.5 grams composite catalyst) with half of the catalyst by mass comprised of α-SiC for reactor one. The catalyst bed length varied from 4.0 cm to 8.0 cm (mass: 2.5 grams: 4.0 cm; 5.0 grams: 8.0 cm, composite catalyst) with 50% or 75% by mass comprised of α-SiC for reactor two. The composite catalysts were subjected to a 650° C. pre-treatment step at 100 sccm UHP oxygen for 4 h before use. The gas mass flowrate was 1 sccm $N_2$ provided using MKS Instruments controllers and RS-485 digital interface (1179A, 0-5 sccm). The exact mass flowrates were calibrated using a 50 cc glass bulb tube timed with a stop watch followed by adjusting the MKS Instruments RS-485 digital interface. The reaction was conducted for an eight-hour period at a 450° C. to 500° C. furnace set point with a contact time of 400 ms (reactor one) or 1920 ms to 3860 ms (reactor two). The corresponding weight-hourly-space-velocity (WHSV) of 22 $h^{-1}$ (reactor 1) and 2.26 $h^{-1}$ to 4.81 h-(reactor 2) was used in the series reactions. The three-zone furnace used was a model 3-1-20-115-WO6SK-J8098/2EA from ThermCraft with the temperature set for 100° C. outer, 400° C. to 500° C. middle, and 250° C. exiting zone. The programmable temperature controllers used within the three-zone furnace were model UP350 from Yokogawa M&C Corporation. The actual top bed and bottom bed catalyst temperatures were recorded using TJC36-CAIN-0206-18 compact transition joint probe from Omega Engineering, Inc with HH506RA thermocouple meter. The condensable gaseous products were collected as liquid at −6° C. using a condenser with the remaining gas products exiting to a 4-channel Agilent Technologies 3000A micro-GC with thermo-conductivity detector (TCD). The gaseous products were also evaluated using Agilent Technologies four-channel micro-GC and a single channel Agilent Technologies 6890 GC. The liquid products were characterized using an Agilent Technologies 5977A MSD 7890B GC-MS system to determine their composition.

Table 1 (below) entails three reactions conducted for eight hours at 500° C. furnace set point with the catalyst pair changed. The first pair of catalysts denoted as 180205 included Commercial-MFI (Comm-MFI) and 2%-Zn-Comm-MFI. The catalyst pair combination average yield was slightly higher than the other two combinations (180207, and 180215). Interestingly, the Lamellar-MFI and 2%-Zn-Lamellar-MFI series pair (180215) produced slightly less average yield than use of Comm-MFI and 2%-Zn-Lamellar-MFI (180207), but the Lamellar-MFI and 2%-Zn-Lamellar-MFI was more selective for mono-benzene derivatives. In Table 2 (below), the contact time was decreased from 3860 ms to 1920 ms, and the furnace set point was 475° C. for 8 h reaction. The average liquid product yield varies depending on the catalyst pair. For example, the Comm-MFI in both reactors one and two produces only 44.3% average yield (170829). However, when placing 2%-Zn-Comm-MFI in the second reactor as a pair with Comm-MFI, the average liquid product yield increases to 59.9% (170831). Furthermore, the selectivity for mono-benzene derivatives is highest amount the catalyst pairs in Table 2. Using 2%-Zn-Lamellar-MFI with Comm-MFI as a pair gave a comparable average yield value of 41.4% (170908) similar to the Comm-MFI pair (44.3%). A replicate of Comm-MFI in reactors one and two gave a yield of 44.4% and a lower selectivity for mono-benzene derivatives of 25.3% (170912). Overall, the results in Tables 1 and 2 suggest that certain pore structures are favored depending on the contact time, such as with reactions 180215 and 170831.

Table 3 (below) details the average yield and selectivity for mono-benzene derivatives as function of the 20% aqueous ethanol (80% water) liquid flowrate. The catalyst pair studied for the three reactions were Comm-MFI in reactors one and two. The highest average liquid yield was at 0.50 mL/minute with 0.75 mL/minute liquid flowrate 3 percent less. The lowest liquid flowrate produced lower average yield and mono-benzene derivatives selectivity. In general, these three reactions suggested that an optimal liquid flowrate would produce the most liquid hydrocarbons. As shown in Table 1, a higher furnace set point of 500° C. provided an avenue to using a higher aqueous liquid ethanol flowrate of 0.75 mL/minute. Beyond the optimization of the furnace set point, 20% aqueous ethanol liquid flowrate, and bed length, the type of catalyst, such as pure three-dimensional microporous zeolite compared with two-dimensional meso-/microporous zeolite appeared to have a major impact on the average liquid product yield and selectivity shown in Table 1. Furthermore, the use of Zn dopant favored greater average liquid product yield and selectivity in Table 2.

Figure 8:
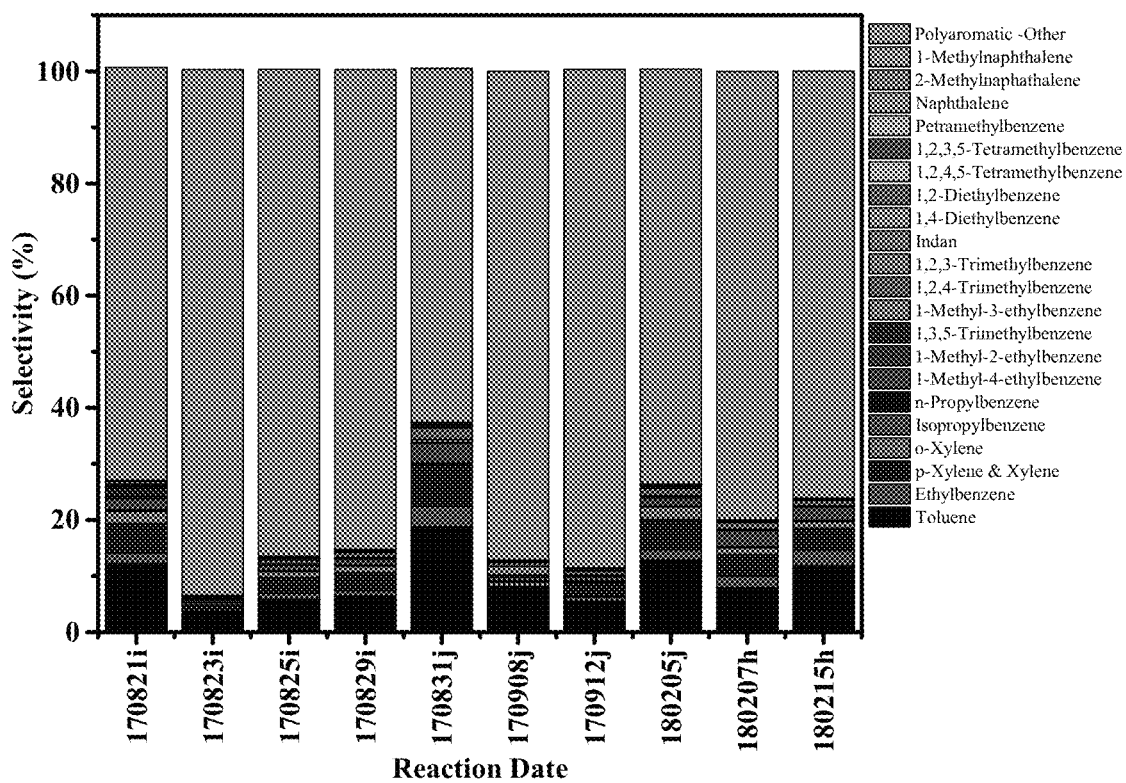
FIG. 8 shows selectivity of composite catalysts used in the two-reactor system according to embodiment.
Figure 9A:
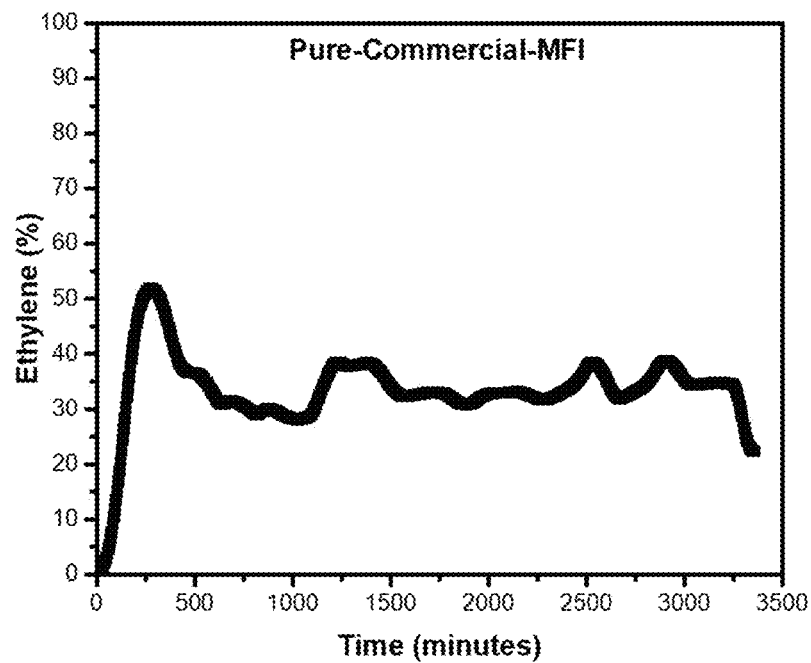
FIG. 9A shows a plot of the Longevity of pure Commercial-MFI over time as a function of ethylene production in single reactor.
Figure 9B:
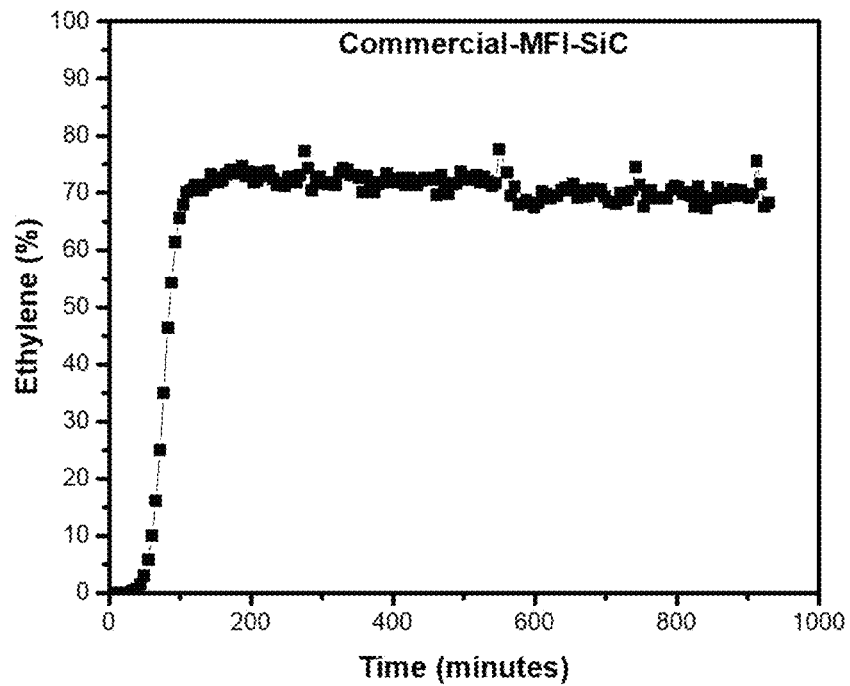
FIG. 9B shows a plots of longevity of Commercial-MFI-SiC over time as a function of ethylene production in single reactor.

FIG. 8 shows the selectivity of the organic hydrocarbon compounds produced in the two reaction system. This process produces many valuable aromatic organic compounds as shown there. Table 4 (below) provides the many commercial uses of the liquid hydrocarbons produced in our reactions using 20% aqueous ethanol (80% water). The durability appears to be enhanced using alpha silicon carbide (α-SiC) with liquid product yield similar over the eight hour reaction period. Longevity studies were completed on pure Commercial-MFI shown in FIG. 9A. The ethylene conversion reaches a maximum in approximately 175 minutes at close to 50% followed by rapid decreasing in 250 minutes to slower deactivation for the remaining reaction period to less than 30%. This decreasing aqueous ethanol conversion implies that pure Commercial-MFI zeolite framework aluminum active sites are eluding from the catalyst, which has been shown before previously when aqueous ethanol reaction is completed at 400° C. and above. In FIG. 9B, longevity reaction is completed on Commercial-MFI-SiC composite, and the aqueous ethanol conversion is constant at 70% over the 900 minutes. This suggests that the α-SiC is effective in preventing dealumination of the zeolite. Likewise, inductively coupled plasma-atomic emission spectroscopy (ICP-AES) analysis suggests no leaching with composite catalyst in contrast to pure zeolite in Table 5 (below).

The yields of ethene (ethylene) from the novel processes are somewhat similar to those previously reported using aqueous ethanol, but the novel processes of the present invention are much more advantageous. For instance, it is noted that Talukdar et al. studied 20 volume % ethanol and see with more bentonite binder of 20 to 80 wt. % saw a reduction in the ethene production from 83% to 60% at 500° C. See Talukdar, A. K.; Bhattacharyya, K. G.; Sivasanker, S., "HZSM-5 catalysed conversion of aqueous ethanol to hydrocarbons." *Applied Catalysis A: General*, 1997, 148 (2), 357-371. This study had up to 11% $C_{6+}$ compounds. Adding all of the components that included gasoline, kerosene, diesel, and heavier carbons together produced approximately 17% yield in this study. Schulz and Bandermann also noted similar outcomes when the ethanol concentration was low within the range of 20 volume %. See Schulz, J.; Bandermann, F., "Conversion of ethanol over zeolite H-ZSM-5." *Chemical Engineering &Technology*, 1994, 17 (3), 179-186. To obtain these results, they used a WHSV of 1 $h^1$, which means the reactor system scale must be larger. In the systems that started with pure ethene as the reactant using zinc or gallium dopant, which is known to increase the liquid aromatic yield, the liquid product yield varied from 15% to 72%. The inventors believe no system exists that starts from 20 volume % (80% water) and produces liquid product yield close to 20%. However, embodiments of the present invention provide increases durability, including no dealumination and reduces deactivation from carbonaceous species, using SiC in conjunction with a two-reactor system in series system produces pure liquid hydrocarbons in the range of up to 60% starting with 20% aqueous (80% water).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, and to describe the actual partial implementation in the laboratory of the system which was assembled using a combination of existing equipment and equipment that could be readily obtained by the inventors, to thereby enable others skilled in the art to best utilize the invention and various embodiments with various modifications as may be suited to the particular use contemplated. While the foregoing is directed to embodiments of the present invention, other and further embodiments of the invention may be devised without departing from the basic scope thereof, and the scope thereof is determined by the claims that follow.

TABLE 1

Bed Length vs. Liquid Mono-Benzene Yield.

| Reaction Date | Average Yield (%) | Fraction of Mono-Benzene Derivatives (%) | Reactor 1 Catalyst | Reactor 2 Catalyst |
|---|---|---|---|---|
| 180205 | 53.6 | 48.9 | Comm-MFI | 2%-Zn-Comm-MFI |
| 180207 | 51.6 | 39.2 | Comm-MFI | 2%-Zn-Lamellar-MFI |
| 180215 | 50.9 | 47.3 | Lamellar-MFI | 2%-Zn-Lamellar-MFI |

Reaction conditions: Contact time 3860 ms (2.26 h$^{-1}$, WHSV), Reactor 2; 25% Catalyst to 75% SiC by mass in Reactor 2; Furnace set-point: 500° C.; 0.75 mL/minute 20% (80% water) liquid flowrate; 8 h reaction; Average yield calculated from the total carbon entering and exiting as liquid products.

TABLE 2

Reaction Temperature vs. Liquid Mono-Benzene Yield.

| Reaction Date | Average Yield (%) | Fraction of Mono-Benzene Derivatives (%) | Reactor 1 Catalyst | Reactor 2 Catalyst |
|---|---|---|---|---|
| 170829 | 44.3 | 32.9 | Comm-MFI | Comm-MFI |
| 170831 | 59.9 | 62.1 | Comm-MFI | 2%-Zn-Comm-MFI |
| 170908 | 41.4 | 31.2 | Comm-MFI | 2%-Zn-Lamellar-MFI |
| 170912 | 44.4 | 25.3 | Comm-MFI | Comm-MFI |

Reaction conditions: Contact time 1920 ms (4.81 h$^{-1}$, WHSV), Reactor 2; 50% Catalyst to 50% SiC by mass in Reactor 2; Furnace set-point: 475° C. Reaction conducted for 8 h time period. 0.75 mL/minute 20% (80% water) liquid flowrate; Average yield calculated from the total carbon entering and exiting as liquid products.
Note:
2%-Zn-Lamellar-MFI has Si/Al ratio of 50 (170908).

TABLE 3

Liquid Reactant Flowrate vs. Liquid Mono-Benzene Yield.

| Reaction Date | Average Yield (%) | Fraction of Mono-Benzene Derivatives (%) | Reactor 1 Catalyst | Reactor 2 Catalyst | 20%-Aq-EtOH Liquid Flowrate (mL/min.) |
|---|---|---|---|---|---|
| 170821 | 42.6 | 62.4 | Comm-MFI | Comm-MFI | 0.50 |
| 170823 | 32.4 | 19.3 | Comm-MFI | Comm-MFI | 0.25 |
| 170825 | 39.6 | 33.2 | Comm-MFI | Comm-MFI | 0.75 |

Reaction conditions: Contact time 2870 ms (3.2 h$^{-1}$, WHSV), Reactor 2, (170821); Contact time 5598 ms (1.60 h$^{-1}$), Reactor 2, (170823); Contact time 1920 ms (4.81 h$^{-1}$), Reactor 2, (170825); 50% Catalyst to 50% SiC by mass in Reactor 2; Furnace set-point: 450° C. Reaction conducted for 8 h time period. Average yield calculated from the total carbon entering and exiting as liquid products.
Note:
Commercial-MFI has Si/Al ratio of 40 (170821, 170823, and 170825).

TABLE 4

Market Survey of Hydrocarbons Produced
Commercial Value of Hydrocarbons

| Component | Commercial Uses |
|---|---|
| Polyaromatic-Other | Dye/Dye precursors, for example: Pyrene |
| Napthalenes | Precursor phthalic anhydride, agrichemcials, and surfactants |
| Pentramethylbenzene | Organic synthesis scavenging agent |
| 1,2,4,5-Tetramethylbenzene (Durene) 1,2,3,5-Tetramethylbenzene (Iso-Durene) | Precursor to pyromellitic dianhydride-curing agent, adhesives, coating materials, engineering plastics (polyimides), and crosslinking agent for alkyd resins |
| Diethylbenzenes: 1,2-diethylbenzene (o-diethylbenznee); 1,4-diethylbenzene (p-diethylbenzene) | Precursor to methyl/ethyl biphenyls for low temperature heat transfer fluid; dehydrogenate-divinylbenzene (DVB). DVB-crosslink polystyrene |
| Indan (Indane) | Synthesis precursor for sulofenur |
| Trimethylbenzene (isomers): 1,2,3; 1,2,4; and 1,3,5 | Precuror to fine chemicals: 2,4,6-trimethyl aniline; component of aviation gasoline; laboratory specialty solvent: organometallic chemistry; electronic industry-developer; photo-patternable-silicones |
| 1-Methyl-3-ethylbenzene, 1-Methyl-2-ethylbenzene, and 1-Methyl-4-ethylbenzene | Production of specialty polystyrenes |
| n-Propylbenzene | Non-polar organic solvent in industries: printing, textile dyeing, methyl styrene production; Organic sysnthesis: Grignard reagent |

TABLE 4-continued

Market Survey of Hydrocarbons Produced
Commercial Value of Hydrocarbons

| Component | Commercial Uses |
|---|---|
| Isopropylbenzene (Cumene) | Precursor-Intermediate for cumene hydroperoxide-produce phenol and acetate |
| Xylenes (ortho, para, and meta) | Component in gasoline and aircraft fuels; precursor to terephthalic acid and dimethyl terephethate-monomers in polyethylene terephthate (PET) bottles and polyester clothing-(phthalic anhydride precursor); solvent: printing, rubber, leather industries. Dentistry: Endodontics (root canals); petroleum industry: paraffin wax solvent. Laboratory: Dry ice. Solvent: paints, varnishes, and cleaning agent for steel, silicon wafers, and integrated circuits. |
| Ethylbenzene | Precursor to styrene; gasoline anti-knock agent; pesticides. Precursor for cellulose acetate; Component in synthetic rubber, paints, and inks |
| Toluene | Paint thinner, solvent, feedstock, component in contact cement, model airplane glue, explosives (TNT). Precursor to dinitrotoluene to toluene diisocyanate-make polyurethane foams. Solvent silicone sealants, lacquers, leather tanners, disinfectants, octane boosters in gasoline fuels. Niche application: Solvent in carbon nanomaterials |

Commercial uses content from Wikipedia.com.

TABLE 5

Elemental Analysis of Pure and Composite Zeolites

| Catalyst | Experimental Conditions | Si/Al Molar Ratio |
|---|---|---|
| Pure Commercial-MFI | Before Reaction | 35 |
| Composite Commercial-MFI-SiC | Before Reaction | 62 |
| Pure Commercial-MFI | After Reaction | 46 |
| Composite Commercial-MFI-SiC | After Reaction | 59 | a. Composite Commercial-MFI-SiC mixed at a mass ratio of 50%/50% of zeolite to SiC.

The invention claimed is:

1. A method to convert an oxygen containing organic compound to one or more water-free liquid hydrocarbons products using a catalytic process in a two-stage reactor system having a first reactor and a second reactor in series, the method comprising:
    in the first reactor, aided with a first catalyst, converting a feedstock of an aqueous solution of an oxygen containing organic compound to ethylene gas and water;
    allowing the resulting ethylene gas produced to flow from the first reactor to the second reactor;
    removing the water with a condenser between the first reactor and second reactor; and
    in the second reactor, aided with a second catalyst, converting the ethylene gas to one or more liquid hydrocarbons,
    wherein 99.5% (by vol.) or more of the water is condensed out of reactor system with the condenser.

2. The method of claim 1, wherein the aqueous solution of the oxygen containing organic compound comprises: alcohol-water (methanol, ethanol, propanol, butanol, and alcohol-water mixtures) aldehyde-water (propanal, and aldehyde-water mixtures) and ketone-water (acetone, butanone, and ketone-water mixtures), and carboxylate-water mixtures (acetate, n-propyl acetate, and n-butyl formate).

3. The method of claim 1, wherein the oxygenated-water mixture comprises ethanol in a concentration between 1% to 50% (by vol.).

4. The method of claim 1, wherein the catalytic reaction in the first reactor is performed using a zeolite-based catalyst.

5. The method of claim 4, wherein the zeolite-based catalyst comprises a three-dimensional (3D) mordenite framework inverted (MFI) catalyst or a two-dimensional (2D) lamellar MFI catalyst.

6. The method of claim 1, wherein the catalytic reaction in the second reactor is performed using a zeolite-based catalyst or a metal or metalloid-doped zeolite catalyst.

7. The method of claim 6, wherein the metal or metalloid doped zeolite catalyst comprises Ga and Zn.

8. The method of claim 6, wherein the zeolite catalyst comprises a 3-D MFI catalyst or a 2-D lamellar MFI catalyst.

9. The method of claim 8, where the 2-D lamellar MFI zeolite catalyst includes both micropores of less than 1 nm and mesopores of 2-50 nm.

10. The method of claim 1, wherein the first reactor operates at a temperature of about 400-500° C. and at a pressure of 1 atmosphere or above.

11. The method of claim 1, wherein the second reactor operates at a temperature of about 400-500° C. and at a pressure of 1 atmosphere or above.

12. The method of claim 1, wherein the one or more liquid hydrocarbons produced comprise: substituted mono-benzenes (benzene, toluene, o-xylene, p-xylene, m-xylene, ethylbenzene, 1-methylethylbenzene, propylbenzene, 1-ethyl-4-methyl-benzene, 1,2,4-trimethylbenzene, 1,2,3-trimethylbenzene, 1-methyl-3-(1-methyl-ethyl)-benzene, 1-propenyl-benzene, 1,3-diethylbenzene, 1-methyl-3-propylbenzene, 1,2-diethylbenzene, 2-ethyl-1,4-dimethylbenzene, 2-ethyl-1,4-dimethylbenzene, 1-ethyl-2,4-dimethylbenzene, 2,4-dimethylstryrene, 1-methyl-indan, 1,2,4,5-tetramethyl-benzene, 2,4-dimethyl styrene, 1,4-diethylstyrene, 1,4-dimethyl-2-methylbenzene, 1,3-diethyl-5-methyl-benzene, 2,3-dihydro-4,7-dimethyl-1H-indene, 2,3-dihydro-1,6-dimethyl-1H-indene, 1-methyl-3-(1-methyl-2-propyl)-benzene, 2-ethyl-2,3-dihydro-1H-indene) and polyaromatic (1,2,3,4-tetrahydro-naphthalene, 2-methyl-napthalene, 1,2,3,4-tetrahydro-2,6-dimethyl-naphthalene, 2-ethyl-naphthalene, 2,6-dimethyl-naphthalene, or 1,5-dimethyl-naphthalene, or 1,6,7-trimethyl-naphthalene) compounds.

13. The method of claim 1, wherein the aqueous solution of the oxygen containing organic compound comprises a 20% (by vol.) ethanol aqueous solution.

14. The method of claim 13, wherein the flowrate of the 20% (by vol.) ethanol aqueous solution entering the first reactor is about 0.75 mL/minute.

15. The method of claim 1, wherein the liquid hydrocarbon yield is approximately 50% (by vol.) or more.

16. The method of claim 1, wherein the feedstock of the aqueous solution of an oxygen containing organic compound is a biomass product.

17. A method to convert an oxygen containing organic compound to one or more water-free liquid hydrocarbons products using a catalytic process in a two-stage reactor system having a first reactor and a second reactor in series, the method comprising:
   in the first reactor, aided with a first catalyst, converting a feedstock of an aqueous solution of an oxygen containing organic compound to ethylene gas and water;
   allowing the resulting ethylene gas produced to flow from the first reactor to the second reactor;
   removing the water with a condenser between the first reactor and second reactor; and
   in the second reactor, aided with a second catalyst, converting the ethylene gas to one or more liquid hydrocarbons,
   wherein the catalysts in the first and second reactors are both mixed homogeneously with a silicon carbide (SiC) binder, the silicon carbide binder preventing dealumination and desilication of the catalyst in the presence of water.

18. The method of claim 17, where the silicon carbon binder comprises α-SiC.

19. The method of claim 17, wherein 99.5% (by vol.) or more of the water is condensed out of reactor system with the condenser.

20. A method to convert an oxygen containing organic compound to one or more water-free liquid hydrocarbons products using a catalytic process in a two-stage reactor system having a first reactor and a second reactor in series, the method comprising:
   in the first reactor, aided with a first catalyst, converting a feedstock of an aqueous solution of an oxygen containing organic compound to ethylene gas and water;
   allowing the resulting ethylene gas produced to flow from the first reactor to the second reactor;
   removing the water with a condenser between the first reactor and second reactor; and
   in the second reactor, aided with a second catalyst, converting the ethylene gas to one or more liquid hydrocarbons,
   wherein the condenser is maintained at a temperature below 0° C.

21. The method of claim 20, wherein the condenser is maintained at a temperature of −10° C.

22. The method of claim 20, wherein 99.5% (by vol.) or more of the water is condensed out of reactor system with the condenser.

* * * * *